United States Patent [19]
Sanford, Sr. et al.

[11] Patent Number: 6,109,924
[45] Date of Patent: *Aug. 29, 2000

[54] EDUCATIONAL CARD SYSTEM

[76] Inventors: Jack G. Sanford, Sr., 301 California Ave., Columbus, Kans. 66725; Jack G. Sanford, Jr., 226 N. First St., Campbell, Calif. 95008

[*] Notice: This patent issued on a continued prosecution application filed under 37 CFR 1.53(d), and is subject to the twenty year patent term provisions of 35 U.S.C. 154(a)(2).

[21] Appl. No.: 09/145,151

[22] Filed: Sep. 1, 1998

[51] Int. Cl.$^7$ ...................................................... G09B 19/02
[52] U.S. Cl. .......................... 434/191; 434/188; 434/209; 434/167; 273/299
[58] Field of Search ..................................... 434/191, 416, 434/169, 167, 171, 345, 172, 210; 273/299, 308

[56] References Cited

U.S. PATENT DOCUMENTS

| | | | |
|---|---|---|---|
| 163,912 | 6/1875 | Birmeli | 434/167 |
| 777,268 | 12/1904 | Thompson | 434/345 |
| 3,302,310 | 2/1967 | Leven | 434/171 |
| 3,469,325 | 9/1969 | Greenberg | 434/191 |
| 4,050,698 | 9/1977 | Brown | 434/167 |

FOREIGN PATENT DOCUMENTS 380620  9/1932  United Kingdom ................... 434/167

Primary Examiner—Robert A. Hafer
Assistant Examiner—Bena B. Miller
Attorney, Agent, or Firm—Patrick Reilly

[57] ABSTRACT

The invention provides one or more question cards and one or more answer cards, where each answer card corresponds to one or more question cards, and whereby a student is can associate each question card with an answer card, and learn by confirming the matching of pattern s located on each card to determine if a correct answer has been chosen. The question card may display an illustration sketch or diagram, or express a statement, an incomplete statement, a question or a mathematical expression, or any of these images separately or in combination. The answer card may express the truth or falsehood of a statement of a corresponding question card, a word or sentence fragment which can be used in combination with an incomplete statement of a corresponding question card to complete a statement, a statement that comprises a correct answer to a question of a corresponding question card and/or a mathematical expression or value that comprises a correct answer to a mathematical expression of a question card. The patterns may be located close to an edge of the answer or question card. The pattern may represent a number expressed in base two, or ten or any base of a whole number.

18 Claims, 5 Drawing Sheets

EDUCATIONAL CARD SYSTEM

BACKGROUND OF THE INVENTION

1. Field of the Invention

The present invention relates to educational and instructional card based systems and tools. More specifically, the present invention relates to easily distinguishing particular answer cards with specifically associated question cards from a group or deck of various associated and unassociated cards.

2. Description of Related Art

People have invented and played games possibly since our origination. Game pieces have been uncovered by archeologists in the ruins of the very earliest civilizations. Objects resembling dominoes were apparently in use during the time of Noah. Educational uses of game playing activities are probably equally as ancient.

There have been numerous attempts to provide enjoyable, game based learning systems for use by the general public. Perry, in U.S. Pat. No. 5,447,433, describes a learning system where students match three dimensional blocks with specially shaped receptacles located on a game board. Perry's learning system allows a student to match a specific question with a pre-designated correct answer by locating uniquely shaped studs on each block so that any one stud may be fitted into only one pre-selected game board receptacle. The blocks present questions and the corresponding answer is located on the game board proximate to a particular receptacle.

While Perry's invention does limit the association of each question block to a pre-selected correct answer, it is unwieldy in wider applications. The physical dimensions of a Perry based game that would include several hundred question/answer combinations would be large and therefore difficult to house and use. Such a game system would also be quite expensive to design, manufacture and distribute.

Tung Y. Chu, in U.S. Pat. No. 4,914,019, discloses a block structure having interlocking slots and arms so that a particular block will interlock with a main block structure. Clyde Pollock, in U.S. Pat. No. 5,238,407, presents another three dimensional block based system with the variation of employing recesses and bosses to associate blocks together correctly.

Clyde Pollock further provides, in U.S. Pat. No. 5,238,408, a fixed holder for assembling an array of blocks. Jason Argiro, in U.S. Pat. No. 4,466,799, discloses a multiplication table instructional device consisting of a number of blocks tied together with elastic bands. The blocks may be arranged together in relation to the deformation patterns of the elastic bands. Herbert S. Chase, in U.S. Pat. No. 4,358.274, shows an educational game system employing pivotally attached blocks.

None of the prior art using three dimensioned blocks, to include the examples cited above, have evaded the cost and size limitations of Perry in their invented structures.

Card based educational games are in wide use today. There are, for example, literally hundreds of ways in which the standard 52 card deck is used to teach the Arabic decimal numbering system. A player-student can learn and reinforce his or her knowledge of counting and ordering by matching the Arabic symbols on the card with an actual count of the quantity of symbolic hearts, clubs, spades or diamonds present on one face of each card.

Specialized card symbol sets have been created for use in particular games, such as ROOK or UNO. These two examples also employ Arabic numerals and unique symbol counts. Colors may also be employed to distinguish suits, such as green and red rather than clubs and hearts.

The educational value of the games of the prior art is limited to comparing the visual count of symbols located on each card with an Arabic numeral.

Flash card based systems require either the presence of a tutor or teacher, or merely provide a correct answer on the flip side from the question card. Requiring the presence of a teacher or tutor is significantly expensive, and the provision of a correct answer on the back of the card imposes the need for a great deal of discipline on the part of the student.

There is, therefore, a long felt need in the educational arts to provide an economical, widely applicable and easily used teaching apparatus that enables a student or game player to compare a card presenting a question with a card presenting an answer and to quickly determine the validity of correspondence between the two cards as proposed by the student or game player.

OBJECTS OF THE INVENTION

It is therefore an object of the present invention to provide a card based teaching system which allows the matching of question cards and answer card in a game style method.

It is another object of the present invention to provide a matching pattern generation technique which can generate a multiplicity of unique patterns, and that can thereby insure that any unique question card pattern located on any question card can be matched only with a substantively similar pattern of one or more answer cards which have been intentionally designed to contain a correct and/or an appropriate answer to any particular question card.

It is an additional object of the present invention to provide a card based teaching tool that can use a matching pattern generation technique and that can insure that any answer card presenting an answer that is not intended to correspond to a selected question card will have a pattern substantively visually different from the pattern found on the selected question card, whereby it is immediately clear to a student or player that an incorrect and/or inappropriate answer is not meant to correspond to the selected question card.

It is a further object of the present invention to provide a matching pattern system that creates a multiplicity of easily distinguishable patterns which are easily recognizable by a student or player.

It is still another object of the present invention to provide a matching code system that allows the use of numerals designating digit values of a numbering system use a whole number as a system base, e.g. a decimal base system or a binary base system.

It is yet a further object of the present invention to provide a card based educational tool that can be used to teach the binary base system to a student or game player.

SUMMARY OF THE INVENTION

These and other objects and advantages of the present invention are achieved by providing a set of question cards and answer cards, where each question card presents a unique visual pattern and a query. A query may comprise an ideogram or ideograms, a sketch or diagram, a photograph, a question, a statement, an incomplete statement, a grammatical sentence, a sentence fragment and/or a whole or partial mathematical expression or value. Each answer card corresponding to a particular question card presents a valid answer to the question card's query in combination with a visual pattern that is substantively similar, or easily associated, to the pattern of the corresponding question cards. A particular answer card and a particular question card are said to correspond, or be in correspondence if the answer presented on the answer card is considered to be, by the designer or author of the set of question and answer cards, an appropriate answer to the query presented on the question card. Corresponding answer and question cards each present a visually similar and corresponding pattern, or different but easily associated patterns, and are thereby held to be corresponding and in correspondence.

The pattern of the answer card is positioned on either or both of the two faces of the answer card. The pattern of the question card is positioned on either or both of the two faces of the question card. The patterns of either card types may be variously located either singularly or repetitively in certain alternate preferred embodiments proximate or distal to any or all edges of a card or anywhere on the surfaces of either or both sides of the card. A card may also contain more than one unique and distinct pattern, whereby a particular set of cards may each be coded with a visual representation of binary numerals, a visual representation of base ten numerals and with a tactile Braille or Braille-like code.

It is understood within this document that the term "unique pattern" is defined to described a visually discernible pattern that is presented by at least one question card and by at least one answer card, and is effectively shaped to quickly inform a student or player, by the visual shape, shade and/or color of the patterns of the all the observed question and answers cards, that a particular question card corresponds to a particular answer card. It is further understood that the term "unique pattern" does not mean to indicate a limitation of the presentation of a particular pattern by only one card.

In certain preferred alternate embodiments of the present invention correspondence is indicated by matching non-identical patterns as seen on corresponding question and answer cards. The correspondence of a question card and an answer card may be confirmed by a negative or complementary pattern match or other appropriate pattern associating and correlating methods known in the art. In still other certain alternate preferred embodiments of the present invention the patterns denoting correspondence between specific question cards and specific answer cards are indicated by tactile features, such as the Braille alphanumeric character set.

In certain preferred embodiments of the present invention certain answer cards may correspond to more than one question card. An answer such as "the city of Paris", or a numeral, say "105" can be appropriate to more than one query. In these cases a particular pattern may be repeated on more than one question card, so that a particular answer card may have a pattern that matches more than one question card.

In certain alternate preferred embodiments a particular query, such as "a name of an Ohio born President of the United States" may have more than one corresponding answer. In these embodiments the pattern presented on the corresponding question cards may be substantively repeated on more than one answer card.

In certain preferred embodiments of the present invention a numerically based system is used to generate the design of the patterns. A binary system, or base two system, may be used, whereby a given pattern may have a numerical value which represents a number as well as a visually unique pattern. It is understood that within this document that a number is an abstract value, where as the expression, or symbolic representation of a particular number. For example, the base ten numeral 9 represents the same number as the binary numeral 1001, or the base nine numeral 10.

Certain preferred embodiments of the present invention use patterns generated in accordance with the symbolic representation of numbers by numeral of base systems of one or more whole numbers, e.g. a binary system or a decimal system.

Those preferred embodiments of the present invention that include the use of patterns based upon the binary system may be of additional value by familiarizing, teaching and/or reinforcing the base two number system to a student or game player. As the binary system is widely used in the computer sciences, an educational tool that increases an understanding of the binary system by a student or a game player can be of significant educational and economic value. More particularly, cards presenting mathematical expressions may, and in certain cases, also present patterns that both denote correspondence between, and indicate a numerical value that is meaningfully related to the informational content of, the corresponding query and answer. For example, a question card that presents the mathematical expression "7×6" may also present a binary based pattern that indicates a binary numeral that is equal to the number value expressed on the question card, e.g. 42 base ten and binary. A student or game player might thereby be able to read or decode the relevant binary value from the pattern of the question card and/or the answer card. This use of the pattern by a student or game player is thereby useful in teaching the binary system.

Binary base numerals and alternate base numerals, e.g. base ten, base three and so on, used in various preferred embodiments of the present invention may be ordered in a horizontal row, a vertical column or other suitable placement scheme known in the art. The most significant digit or bit of a particular numeral may be located at either the left extreme or the right extreme of a row of digits, or at the top or bottom of a vertical column of bits or digits.

Certain alternate preferred embodiments of the present invention include erasable surfaces whereby a teacher, student or other person may routinely remove an answer or query from a question card or answer card by cleaning and then write or add a new question or answer. This allows for a wider range of use of a given set of cards.

The term mathematical operator symbol is defined in this document to include any visual or tactile image used to indicate a mathematical operation, value, relationship or equivalence, e.g. multiplication, addition, equivalence or another suitable mathematical or logical operation known in the art.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
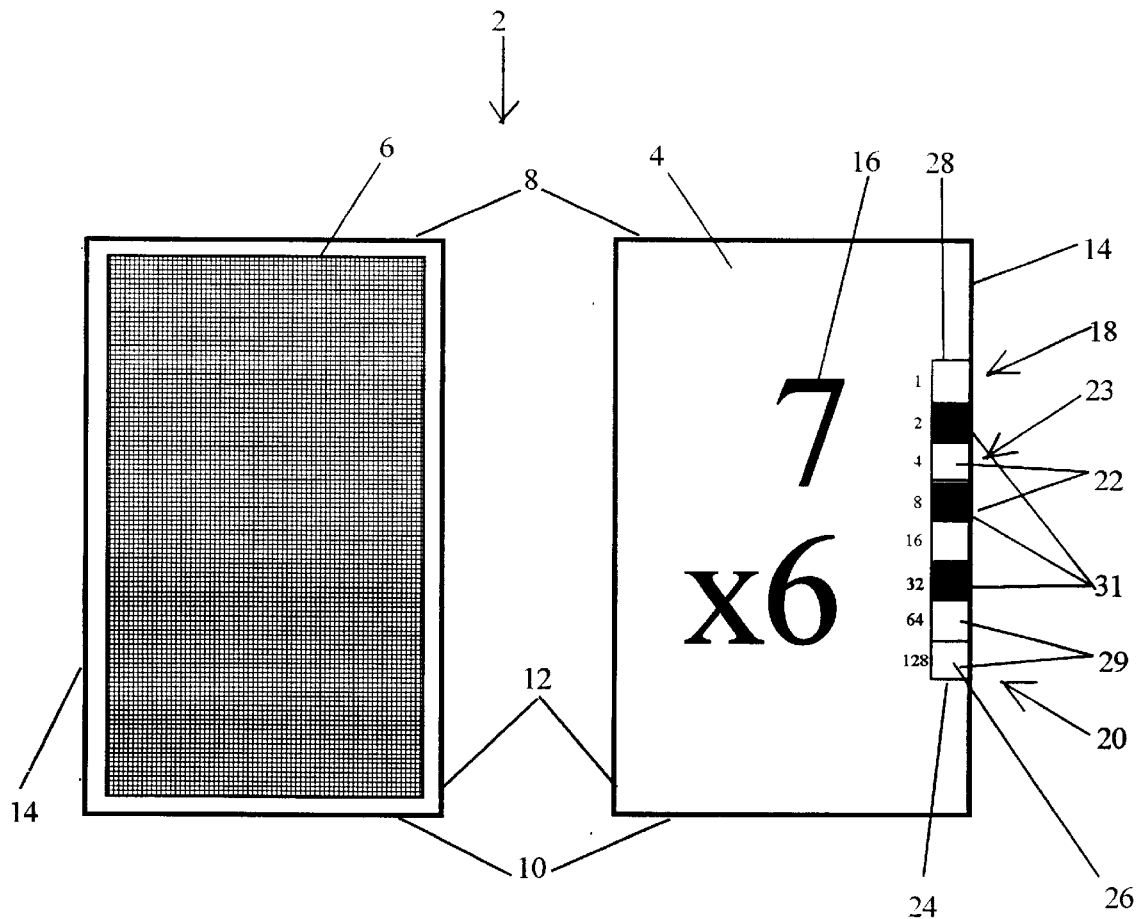
FIG. 1 is a view of a question card.

Referring now to FIG. 1, a question card 2 is made of plastic, cardboard or other suitable materials known in the art. The question card 2 is substantively flat and presents a question face 4 and a back face 6. The perimeters of both faces 4, 6 are defined by a shared top edge 8, a shared bottom edge 10, a shared first side edge 12 and a shared second side edge 14. The top edge 8 and bottom edge 10 are two and one quarter inches in length and the first and second side edges 12, 14 are three and five eighths inches in length. Other suitable lengths of the edges 8, 10, 12 & 14 and alternate suitable cross-sectional sizes of the question face 4 and the back face 6 are employed in various alternate preferred embodiments of the present invention.

A question 16 and a question pattern strip, or pattern 18 are located on the question face 4, where the question 16 and the pattern 18 are imaged on question face 4 by printing, writing or other suitable means known in the art.

In certain alternate preferred embodiments of the present invention the question face 4 includes a coating of a material that allows for the erasure or removal of the question 16, and the writing or otherwise placing of a new question onto the question face 4. The retention of the pattern strip 18 thus allows for the re-cycle and re-use of the question card 2 by relating the new question to a pre-selected answer card.

The question pattern 18 includes a binary numeral 20 expressed in a series of bits 22 located in or at a series of cells 23 ordered in a vertical column 24. The set of cells 23 includes unshaded cells 29 and shaded cells 31.

The vertical column 24 of cells 23 and bits 22 is located substantively proximate to the second side edge 14. A most significant bit 26 of the vertical column 24 is located most proximate to the bottom edge 10 and represents a base ten integer value of 128. A least significant bit 28 of the vertical column 24 is located most proximate to the top edge 8 and represents a base ten integer value of 1. The pattern 18 expresses a numerical value by representing a binary "0" digit as an open, unshaded or clear cell 29, add by representing a binary "1" value as a darkened, shaded or colored cell 31. The numeral 20 presented in binary on the question face 4 presents a "0" value in the cells 23 positioned in the vertical column 24 to represent the base ten values of 1, 4, 16, 64 and 128. The cells 31 representing the base ten values of 2, 8 and 32 are darkened, shaded or colored to represent the binary digit "1". The base ten value of the numeral expressed by the binary pattern 18 is therefore the cumulative sum of decimal values 2 and 8 and 32, and equal to 42 base ten.

It is understood that various alternate preferred embodiments include very large numerals wherein the maximum representeable integer value is limited only by the surface area of the card and the sizes of the cells. The cells 23 of the preferred embodiment are formed as squares having four 0.25 inch long sides. Various suitable alternate sizes and shapes known in the art, e.g. circular and triangular, of the cells 23 are used in diverse alternate preferred embodiments of the present invention.

The question 16 of the question card 2 of FIG. 1 is a mathematical expression and equation that represents the multiplication of the base ten numeral seven by the base ten numeral six, whereby the question 16 is formed to implicitly ask for a product of the multiplication.

Figure 2:
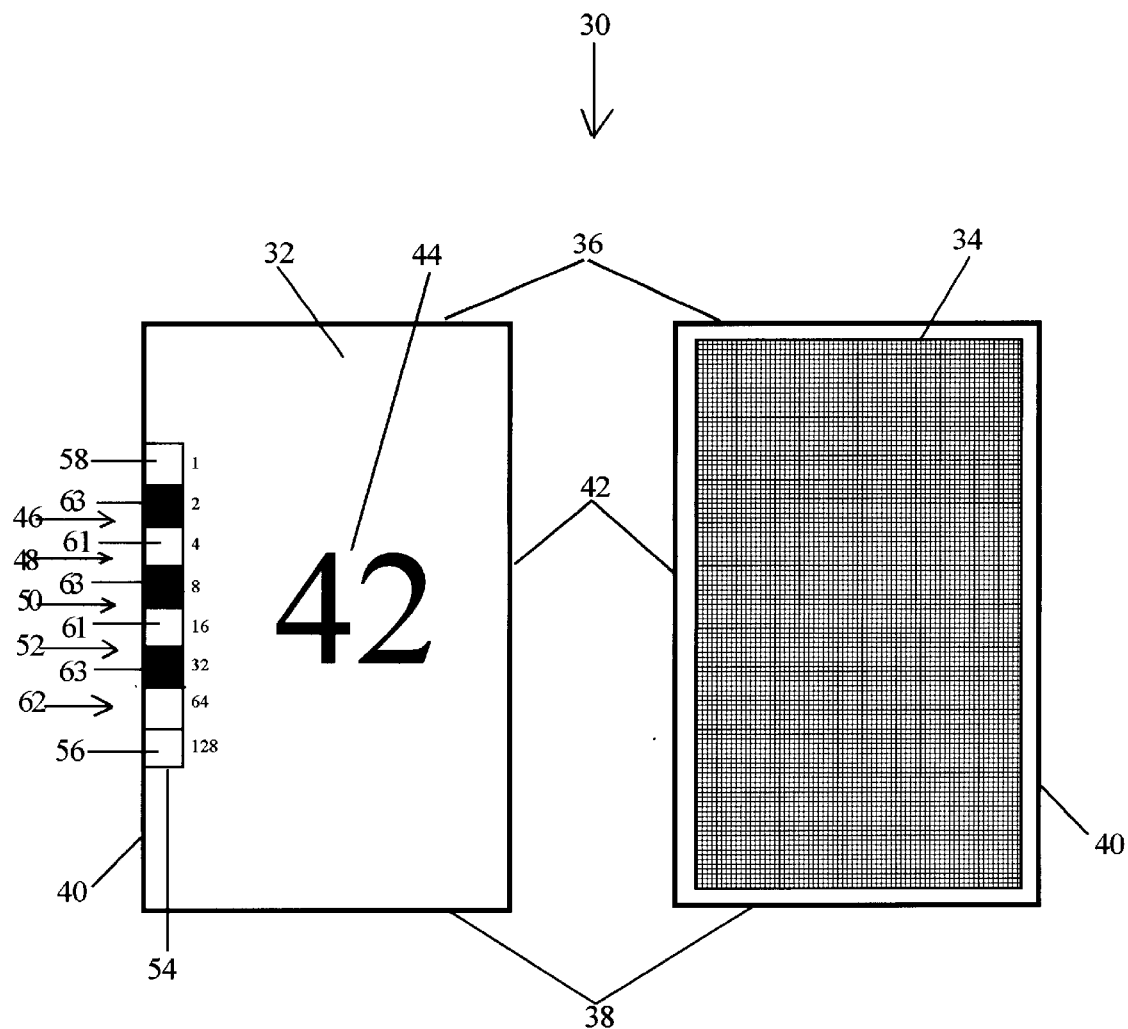
FIG. 2 is a depiction of an answer card corresponding to the question card of FIG. 1.

Referring now to FIG. 2, an answer card 30 is made of plastic, cardboard or other suitable materials known in the art. The answer card 30 is substantively flat and presents an answer face 32 and a posterior face 34. Perimeters of both answer and posterior faces 32, 34 are jointly defined by an answer top edge 36, an answer bottom edge 38, a third side edge 40 and a fourth side edge 42. The answer top edge 36 and the answer bottom edge 38 are two and a quarter inches in length and the third and fourth edges 40 & 42 are three and five eighths inches in length. Other suitable lengths of the edges 36, 38, 40 & 42 and alternate suitable cross-sectional sizes of the answer face 32 and the posterior face 34 are employed in various alternate preferred embodiments of the present invention.

An answer 44 and an answer pattern strip, or answer pattern 46 are located on the answer face 32, where the answer 44 and the answer pattern 46 are imaged on the answer face 32 by printing or writing or other suitable means known in the art.

In certain alternate preferred embodiments of the present invention the answer face 32 is made of a material that allows for the erasure or removal of the answer 44, whereby the answer card 30 may be re-used or re-cycled by placing a new answer onto the answer face 32.

The answer pattern 46 includes a binary numeral 48 expressed in a series of bits 50 located in or at a series of cells 52 ordered in a vertical column 54. The series of cells 52 includes unshaded cells 61 and shaded cells 63.

The vertical column 54 of cells 52 and bits 50 is located substantively proximate to the third side edge 40. A most significant bit 56 of the vertical column 54 is located most proximate to the answer bottom edge 38 and represents a base ten integer value of 0 or 128. A least significant bit 58 of the vertical column 54 is located most proximate to the answer top edge 36 and represents a base ten integer value of 0 or 1. The answer pattern 46 expresses a numerical value by representing a binary "0" digit as an open, unshaded or clear cell 61, and by representing a binary "1" value as a darkened, shaded or colored cell 61. A numeral 62 presented in binary on the answer face 32 includes "0" values in the cells 52 positioned in the vertical column 54 to represent the base ten values of 1, 4, 16, 64 and 128. The cells 63 representing the base ten values of 2, 8 and 32 are darkened, shaded or colored to represent the binary digit "1". The base ten value of the numeral 62 expressed by the binary answer pattern 46 is therefore the cumulative sum of decimal values 2 and 8 and 32, and is equal to 42 base ten.

The answer 44 of the answer card 30 of FIG. 1 is a decimal numeral 42 that corresponds as a numeric equivalent to the value expresses by the question 16 of the question card 2 of FIG. 1. The question pattern 18 and the answer pattern 46 are substantively visually similar whereby a game player may confirm that the answer card 30 of FIG. 2 is designated by a game designer to correctly match with or correspond to the question card 2 of FIG. 1.

Figure 3:
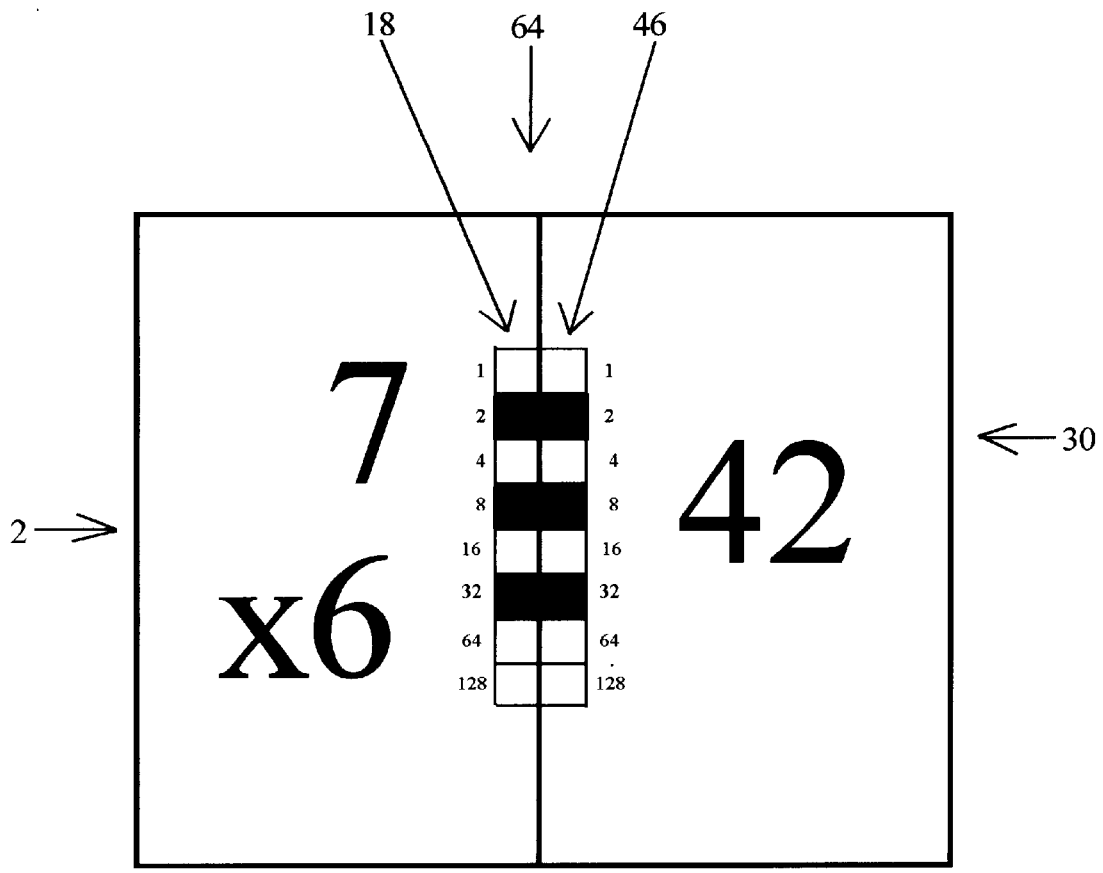
FIG. 3 is an illustration of the question card of FIG. 1 and the answer card of FIG. 2 aligned next to each other.

Referring now to FIGS. 1, 2 and 3, the question pattern 18. of the question card 2 may be positioned vis-a-vis the answer pattern 46 of the answer card to confirm the substantively visually identical nature of the pattern 18 of the question card 2 and the answer pattern 46. The game player thereby confirms that a combination 64 of the question card 2 and the answer card 30 includes the selected answer card 30 that correctly corresponds to the question card 2.

The equivalence of the binary value expressed by the question pattern 18 and the answer pattern 46 to the decimal value expressed by the answer 64 may be used to teach and reinforce an understanding of the binary system in the game player.

The shading and coloring of the question pattern 18 and the answer pattern 46 may be varied in certain alternate preferred embodiments of the present invention whereby a varying pattern scheme may be used such that the question pattern 18 and the answer pattern 46 are easily visually associated but not identical. These alternate visual association methods may employ negative patterns whereby, a darkened cell represents a "0" on an answer card but a "1" on a question card, or a "1" is represented by a blue shade or color on the answer card but by a red shade or color on the question card. Certain of these alternate preferred embodiments thereby employ suitable coloring and shading pattern matching systems known in the art that present suitable non-identical but easily associated matching patterns.

Figure 4:
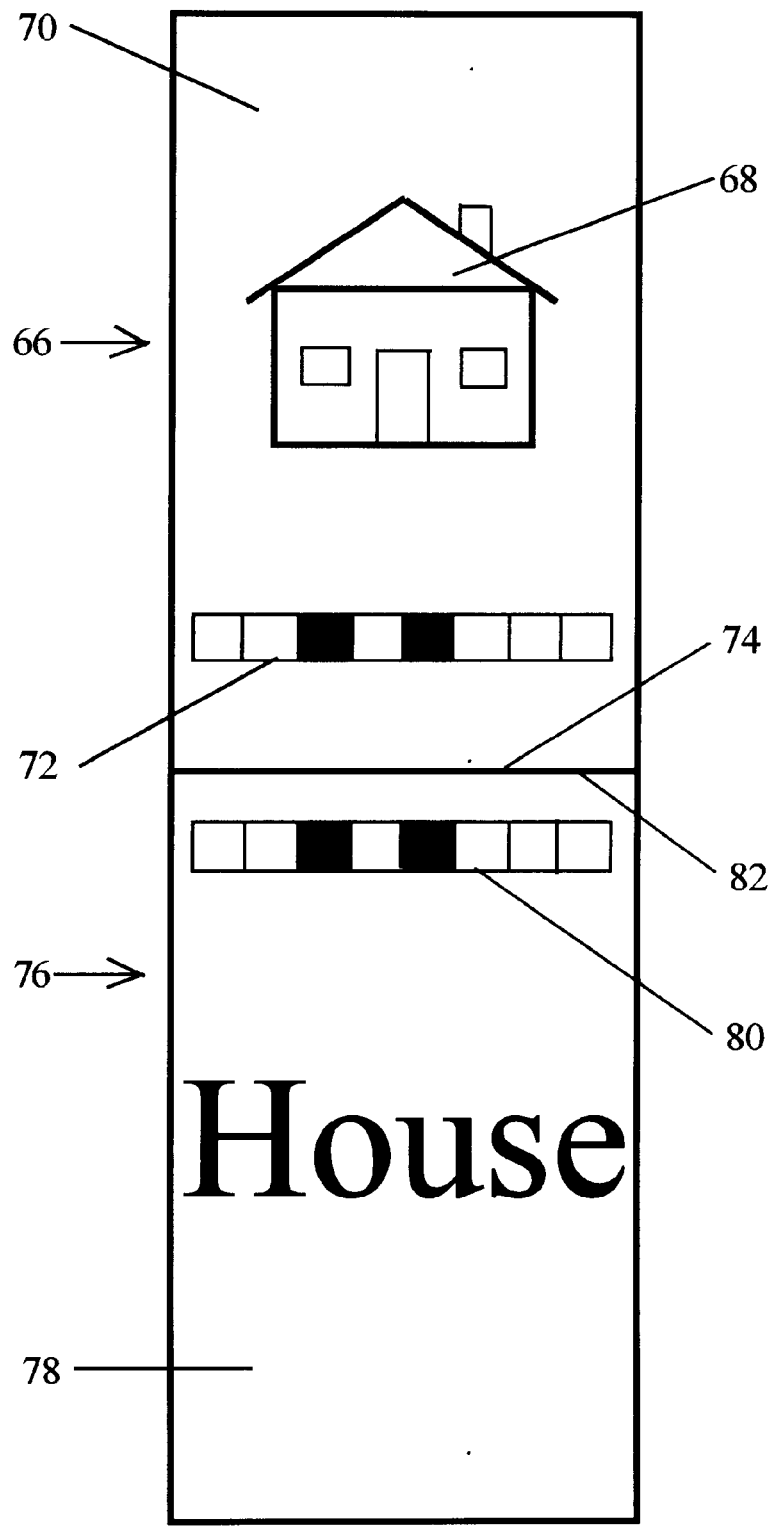
FIG. 4 is a view of an answer card with a horizontal pattern located relatively distal from a bottom edge.

Referring now to FIG. 4, a house question card 66 includes a house image 68 on a house question face 70 and a house question pattern 72. The house question pattern 72 is oriented in a row 73 parallel to and relatively distal from a bottom house card edge 74. A corresponding answer card 76 includes a house card answer face 78 and a house answer pattern 80. The house answer pattern 80 is oriented in a row parallel to and relatively proximate from a top house card edge 82.

Orienting the house answer pattern 80 proximate to the house question pattern 72 allows the game player to visually confirm that the house answer card 76 correctly corresponds to the house question card 66.

Figure 5:
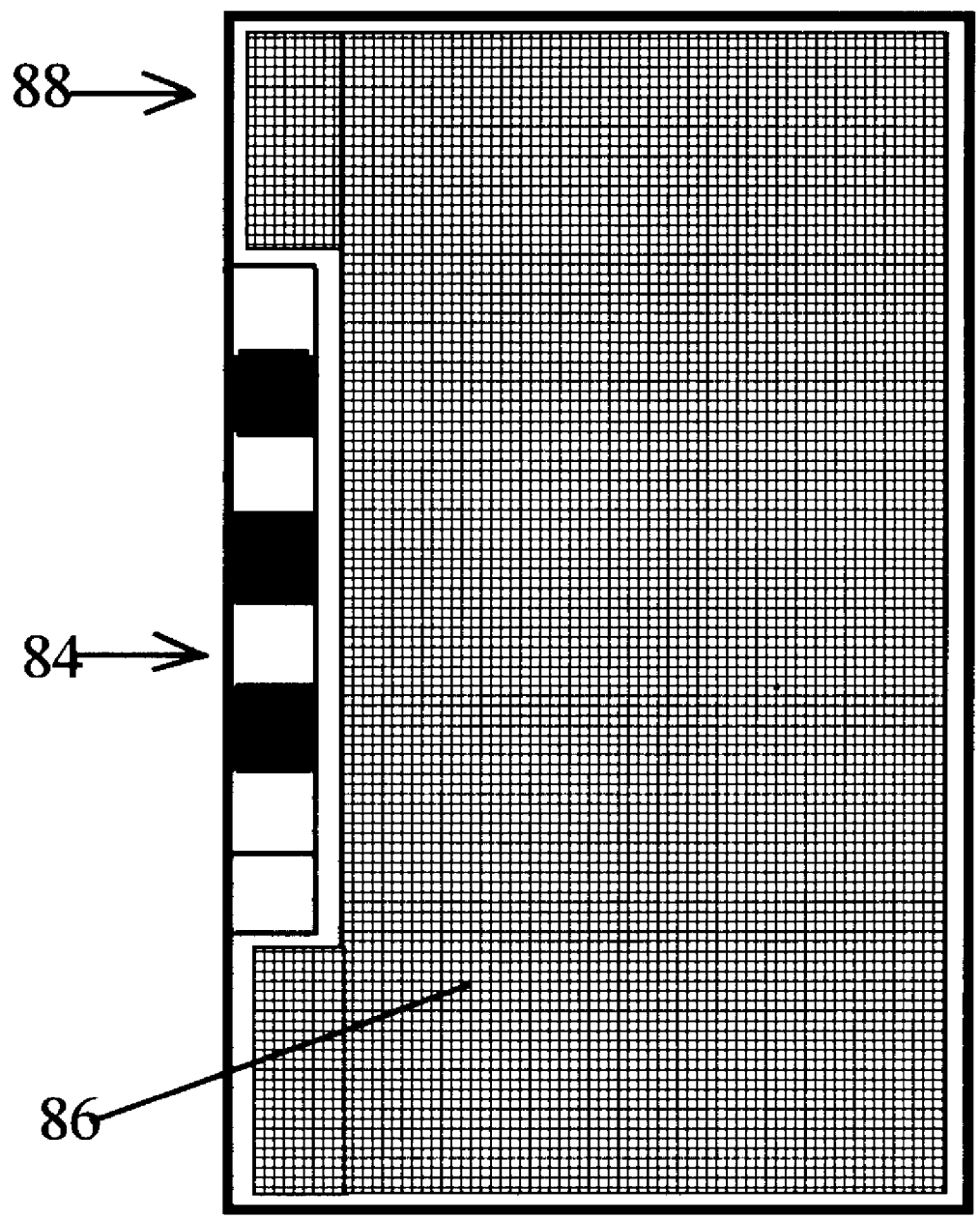
FIG. 5 is an depiction of an answer card with an answer pattern located on a posterior side.

Referring now to FIG. 5, a posterior answer pattern 84 is located on a posterior face 86 of a posterior answer card 88, whereby the game player selects the answer card 88 by observing a question of a question card, not shown, then evaluating an answer located on a posterior answer face, not shown, of the posterior answer card 88 without the benefit of comparing an answer pattern with a question pattern. The placement of the posterior answer pattern 84 on the posterior face 86 combined with an absence of an identifying correspondence pattern on the posterior answer face, not shown, of the posterior answer card 88 allows the user to first select the answer card 88 on the basis of associated the answer with a question of a question card and then verifying the correctness of the selected answer card 88 by flipping the posterior answer card 88 over and then viewing the posterior answer pattern 84 as located on the posterior face 86 in comparison with a question pattern. The alternate method of answer pattern placement of FIG. 5 allows a game player to use the answer and question patterns to confirm the correctness of a associating a particular answer card with a particular question card.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An educational card system comprising:
   (a) a question card having a question face and a back face, said question face having a visual representation of a query;
   (b) an answer card having an answer face and a posterior face, said answer face having a visual representation of a correct answer to said query, said correct answer comprising a numeric value;
   (c) a first pattern strip, said first pattern strip visually presented and located on said question card, said first pattern strip including at least two binary digit values, said binary digit values equal in arithmetic summation to said numeric value of said correct answer; and
   (d) a second pattern strip, said second pattern strip substantively visually similar to said first pattern strip, said first pattern strip including at least two binary digit values, said binary digit values equal in arithmetic summation to said numeric value of said correct answer and where said second pattern strip is visually presented and located on said answer card whereby a student can accurately visually associate said question card with said answer card from a multiplicity of question cards and answer cards and thereby confirm that said query is correctly matched to said correct answer, where each of said multiplicity of question cards and answer card comprise pattern strips substantively visualiy distinguishable from said first pattern and said second pattern.

2. The card system of claim 1, wherein said visual representation of said query comprises an ideogram.

3. The card system of claim 1 wherein said first pattern strip comprises a pattern of one's and zero's, said one's and zeroes representing said binary digit values, whereby a binary number equal to the value of said answer is visually repesented.

4. The card system in claim 1, wherein said first pattern strip comprises a pattern of color cells, whereby said color cells represents said binary digit values and the arithmetic summation of said binary values equals to said correct answer.

5. The card system of claim 1, wherein said second pattern strip is located proximal to an edge of said answer edge.

6. The card system of claim 1, wherein said visual representation of said correct answer comprises an answer series of alphanumeric characters, wherein said answer series of alphanumeric characters comprises a word.

7. The card system of claim 6, wherein said answer series of alphanumeric characters comprises a sentence fragment.

8. The card system of claim 6, wherein said answer series of alphanumeric characters comprises a complete grammatical sentence.

9. The card system of claim 6, wherein said answer series of alphanumeric characters comprises a mathematical expression.

10. The card system of claim 9, wherein said answer series of alphanumeric characters comprises a mathematical value.

11. The card system of claim 1, wherein said visual representation of said query comprises a series alphanumeric characters, wherein said series of alphanumeric characters comprises a word.

12. The card system of claim 11, wherein said series of alphanumeric characters comprises a sentence fragment.

13. The card system of claim 11, wherein said series of alphanumeric characters comprises a complete grammatical sentence.

14. The card system of claim 13, wherein said complete grammatical sentence is a question.

15. The card system of claim 11, wherein said series of alphanumeric characters comprises a mathematical expression.

16. The card system of claim 15, wherein said mathematical expression comprises a set of numeric characters.

17. The card system of claim 16, wherein said series of alphanumeric characters further comprises at least one mathematical operator symbol.

18. Educational card system comprising:
   (a) a quadrilateral question card having a question face, a back face and a first set of four straight edges, said question face having a visual representation of a query;
   (b) a quadrilateral answer card having an answer face, a posterior face and a second set of straight four edges, said answer face having a visual representation of a correct answer to said query, said correct answer comprising a numeric value;
   (c) a first pattern strip, said first pattern strip visually presented and located on said question card, said first pattern strip representing at least two binary digit values, said binary digit values equal in arithmetic summation to said numeric value of said correct answer; and
   (d) a second pattern strip, said second pattern strip substantively visually similar to said first pattern strip, said first pattern strip representing at least two binary digit values, said binary digit values equal in arithmetic summation to said numeric value of said correct answer and where said second pattern strip is visually presented and located on said answer card whereby a student can accurately visually associate said question card with said answer card from a multiplicity of question cards and answer cards and thereby confirm that said query is correctly matched to said correct answer, where each of said multiplicity of question cards and answer card comprise pattern strips substantively visually distinguishable from said first pattern and said second pattern.

* * * * *